US009203874B2

(12) United States Patent
Kadishay et al.

(10) Patent No.: US 9,203,874 B2
(45) Date of Patent: Dec. 1, 2015

(54) PORTAL MULTI-DEVICE SESSION CONTEXT PRESERVATION

(71) Applicants: Yotam Kadishay, Tel Aviv (IL); Dvir Cooper, Ashqelon (IL)

(72) Inventors: Yotam Kadishay, Tel Aviv (IL); Dvir Cooper, Ashqelon (IL)

(73) Assignee: SAP Portals Israel Ltd, Ra'anana (IL)

( * ) Notice: Subject to any disclaimer, the term of this patent is extended or adjusted under 35 U.S.C. 154(b) by 322 days.

(21) Appl. No.: 13/740,603

(22) Filed: Jan. 14, 2013

(65) Prior Publication Data

US 2014/0201377 A1 Jul. 17, 2014

(51) Int. Cl.
 *G06F 15/16* (2006.01)
 *H04L 29/06* (2006.01)
(52) U.S. Cl.
 CPC ........ *H04L 65/1069* (2013.01); *H04L 65/1093* (2013.01)
(58) Field of Classification Search
 None
 See application file for complete search history.

(56) References Cited

U.S. PATENT DOCUMENTS

| 8,463,880 | B2 * | 6/2013 | Dandabany | 709/220 |
| 2004/0068567 | A1 * | 4/2004 | Moran et al. | 709/227 |
| 2005/0188066 | A1 * | 8/2005 | Papanikolaou et al. | 709/223 |
| 2008/0126227 | A1 | 5/2008 | Banino et al. | |
| 2009/0132712 | A1 * | 5/2009 | P et al. | 709/227 |
| 2010/0145997 | A1 | 6/2010 | Zur et al. | |
| 2011/0131332 | A1 * | 6/2011 | Bouazizi | 709/227 |

OTHER PUBLICATIONS

Single Sign-On, http://en.wikipedia.org/w/index.php?title=Single sign-on&oldid=469247305, (Last visited Jan. 14, 2013).

* cited by examiner

*Primary Examiner* — Mohamed Ibrahim
(74) *Attorney, Agent, or Firm* — Fish & Richardson P.C.

(57) ABSTRACT

A computer-implemented method includes: detecting, in a system running a portal, that a first portal session for a first user exists with regard to a first device operated by the first user; receiving a session transfer command that the first user generates using the first device and that indicates at least a second device; in response to the session transfer command, providing session information to the second device that reflects the first portal session; receiving a session initiation command that a second user generates using the second device, the session initiation command generated by the second device based on at least part of the session information; and in response to the session initiation command, creating a second portal session in the system, the second portal session corresponding to the first portal session.

20 Claims, 4 Drawing Sheets

US 9,203,874 B2

PORTAL MULTI-DEVICE SESSION CONTEXT PRESERVATION

BACKGROUND

A portal can provide users with a single point of access to a collection of resources, e.g., information, applications, data bases, media, music, games, tools and other resources that a user may access through a network, such as the Internet. Different types of portals may exist for companies, businesses, educational institutions, the government, and other entities.

Users often use more than one computer in their daily lives. For example, a user may have one or more mobile devices, such as smartphones, table computers, or other computerized mobile devices. The same user may also own or use one or more of a laptop computer, a personal computer, or a computer at work. Often user may access the same content on two or more devices, including mobile and non-mobile devices.

SUMMARY

In a first aspect, a computer-implemented method includes: detecting, in a system running a portal, that a first portal session for a first user exists with regard to a first device operated by the first user; receiving a session transfer command that the first user generates using the first device and that indicates at least a second device; in response to the session transfer command, providing session information to the second device that reflects the first portal session; receiving a session initiation command that a second user generates using the second device, the session initiation command generated by the second device based on at least part of the session information; and in response to the session initiation command, creating a second portal session in the system, the second portal session corresponding to the first portal session.

In a second aspect, a computer program product embodied in a non-transitory computer-readable storage medium and includes instructions that when executed by a processor perform a method for transferring portal sessions. The method includes: detecting, in a system running a portal, that a first portal session for a first user exists with regard to a first device operated by the first user; receiving a session transfer command that the first user generates using the first device and that indicates at least a second device; in response to the session transfer command, providing session information to the second device that reflects the first portal session; receiving a session initiation command that a second user generates using the second device, the session initiation command generated by the second device based on at least part of the session information; and in response to the session initiation command, creating a second portal session in the system, the second portal session corresponding to the first portal session.

In a third aspect, a system includes: one or more processors; and a computer program product embodied in a non-transitory computer-readable storage medium and comprising instructions that when executed cause performance of a method for transferring portal sessions. The method includes: detecting, in a system running a portal, that a first portal session for a first user exists with regard to a first device operated by the first user; receiving a session transfer command that the first user generates using the first device and that indicates at least a second device; in response to the session transfer command, providing session information to the second device that reflects the first portal session; receiving a session initiation command that a second user generates using the second device, the session initiation command generated by the second device based on at least part of the session information; and in response to the session initiation command, creating a second portal session in the system, the second portal session corresponding to the first portal session.

Implementations can include any or all of the following features. The method further includes: determining that the first device and the second device are physically separated by at most a certain distance, wherein providing the session information is conditioned on the determination. The first portal session is created after security credentials are submitted when the first user performs a sign-on procedure, and the second portal session is created without the second user performing the sign-on procedure. The session transfer command includes a near field communication between the first device and the second device. The session transfer command includes: session credentials associated with the first user and the portal; and context information reflecting the first portal session. Creating the second portal session includes restoring a context of the first portal session.

Particular implementations may realize none, one or more of the following advantages. Users can save time and frustration by not having to re-enter data and/or make selections on a second device that was already entered/selected in a first portal session on a first device. Users can share all or part of a portal session with other users. If a mobile device being used by the user cannot run a particular application from the portal, then the user can transfer the portal session to a non-mobile device that can support the application.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for preserving context for a portal session that is created on another device. For example, a user running a first portal session on a first device (e.g., a smartphone) may want to continue the portal session on a second device (e.g., a personal computer). The user can therefore in a sense transfer the portal session to the second device, so that the context (e.g., the user's progress, inputs and current state relative to the portal session) can be preserved. The portal session can be transferred, for example, in response to a session transfer command, which can be enabled when the first and second device are close enough to allow a near field communication (NFC) between the devices. Other data transferring mechanisms can be used. The transfer can occur without requiring the user to re-enter credentials for accessing the portal, to name just one example.

Figure 1:
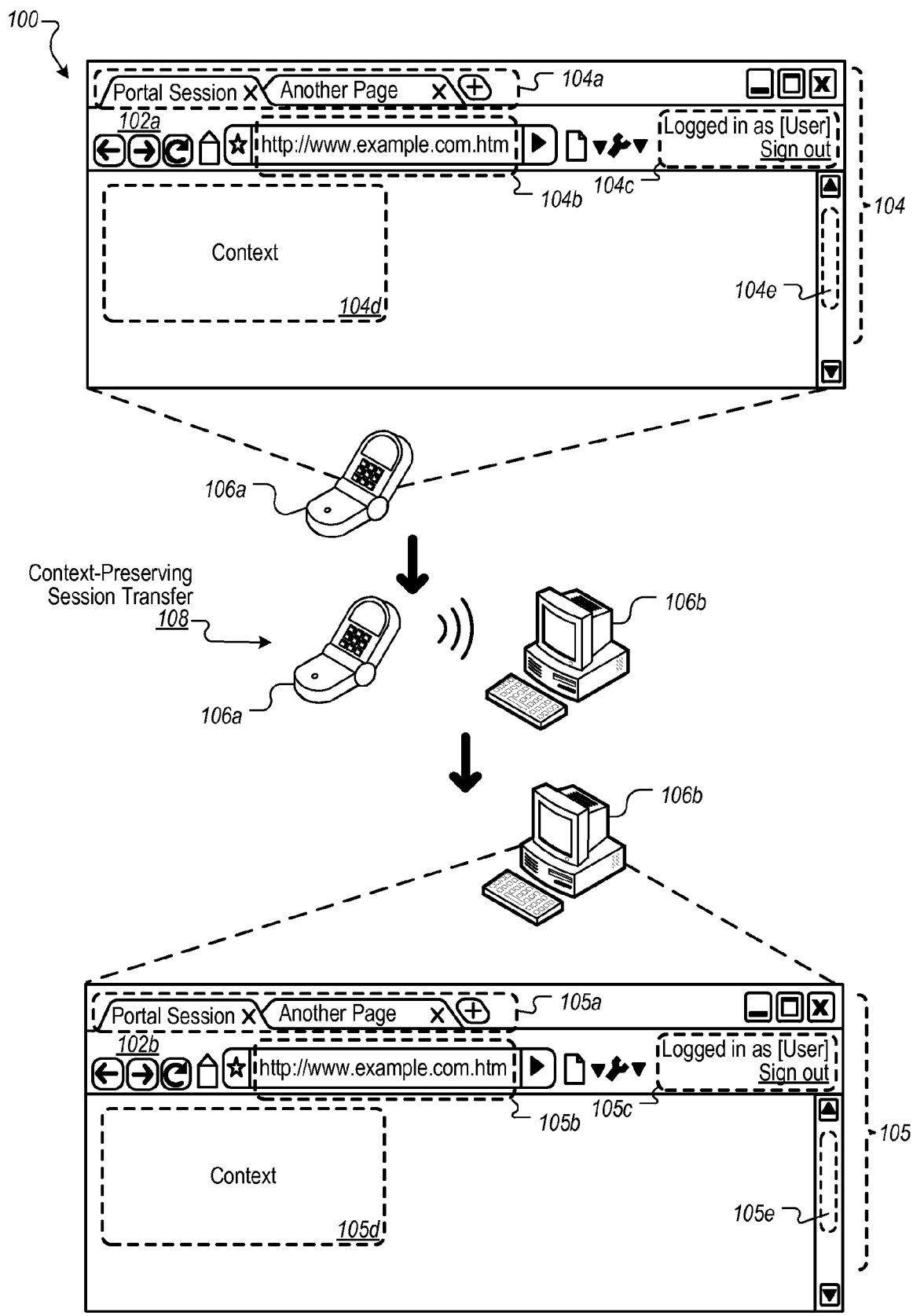
FIG. 1 shows an example system for preserving a context of a first portal session when creating a second portal session.

FIG. 1 shows an example system 100 for preserving a context of a first portal session 102a when creating a second portal session 102b. The creation and transition to the second portal session 102b can be context-preserving and relatively automatic, e.g., without requiring a second portal log-in by the user. For example, the first portal session 102a has a first context 104 and is executing on a first device 106a (e.g., a smartphone). Contexts, such as the first context 104, can be characterized by one or more aspects, conditions and/or states of a portal session. For example, the first context 104 can include multiple context elements 104a-104e, including a first context 104a corresponding to current options selected, a second context 104b corresponding to a current address or universal resource locator (URL), a third context 104c corresponding to a current user login, a fourth context 104d corresponding to portal content/inputs, a fifth context 104e corresponding to a current scroll amount, and/or any other conditions and attributes that a user may want to continue or restore on a second portal session created from the first one. In some implementations, the fourth context 104d can include content displayed or otherwise presented to the user and inputs/selections made by the user. For example, user inputs/selections can include values entered in or selected for fields, text and/or drawings provided by the user, selections of controls such as checkboxes, sliders, etc., and/or other user inputs that constitute a level of progress or a current state in the first portal session 10a.

The user who is operating the first portal session 102a may wish, for example, to continue the portal session on another device, or transfer the portal session (or share it) with another user. The system 100 can provide the ability to transfer the first portal session 102a while preserving the portal session's context. In some implementations, this can occur in a context-preserving session transfer 108 that is initiated, for example, with a session transfer command sent from the first device 106a. For example, the session transfer command can occur using an NFC that is directed to a second device 106b (e.g., the user's home computer). Other data transferring mechanisms can be used. Subsequent to the session transfer command, a session initiation command can occur. This can result in the creation of a second portal session 102b, having a second context 105 and executing on the second device 106b. The contexts 104 and 105 can be identical or similar to each other. For example, the second portal session 102b can be identical to the first portal session 102a. In this example, the multiple content elements 105a-105e are the same as the multiple content elements 104a-104e. As another example, other context elements not shown in FIG. 1 may also or instead be identical or similar.

Other types of contexts can be preserved when portal sessions are transferred. In some implementations, the context can include a current content location (e.g., the application that the user was in), a navigational/hierarchical aspect, such as if the user on the first portal session 102a was filling out a form on screen Z. The screen Z, for example, may be accessible from option Y selected from a menu X available under session function W. When the portal session is transferred to the second device 106b and the context is restored, the context can include information for recreating the W-->X-->Y-->Z navigation. This can allow the second device 106b to display the screen Z and show the navigation through W.X.Y, e.g., by showing those options selected or highlighted in a suitable way. In some implementations, a partially filled form can be recreated. For example, the screen Z can include the values that the user has already provided on the form. In some implementations, one or more session customizations can be preserved. For example, that the user is currently in a View Mode of "full screen" can be restored in the new context. Other types and levels of navigations and hierarchies are possible.

In another example, the context that is restored can maintain a record of the user's history on the first device. For example, by selecting a history option on the restored session, the user's recently-visited entries (e.g., web pages, URLs, functions, etc.) can be displayed, or related information provided to the user. In some implementations, the session context information can include session customizations, such as how information is to be presented on the screen (e.g., view mode="full screen") or other settings (e.g., brightness, volume, etc.).

In some implementations, contexts can be preserved in this way based on portals regularly capturing the current state of a user's portal session. For example, user portal session states can be captured every N seconds or whenever the user performs an action that corresponds to a context element that is worthy of preserving.

In some implementations, user customization options/settings can be made available to the user of the first device 106a by which the user can specify a subset of the context 104 that is to be preserved in the context-preserving session transfer 108. For example, the user of the first device 106a may wish to preserve only one or more particular context aspects, or may wish to preserve all of the context 104 except for selected individual fields entered in the fourth context 104d. For example, when user-entered data in the fourth context 104d includes personal, sensitive or private information, the user can selectively select the portion(s) of context to preserve or not preserve.

In some implementations, a particular portal may have rules that limit the data that can be propagated from one portal session to another, e.g., to automatically block the restoration of names, addresses, telephone numbers and/or other personal information from being copied to another portal session. In some implementations, data fields on a portal screen not populated during the context-preserving session transfer 108 can be highlighted or annotated in some way.

In some implementations, a portal session can be transferred or propagated to two or more devices substantially at the same time. For example, in a training environment, the portal session on an instructor's computer may be transferred to each of the computers used by the students.

Figure 2:
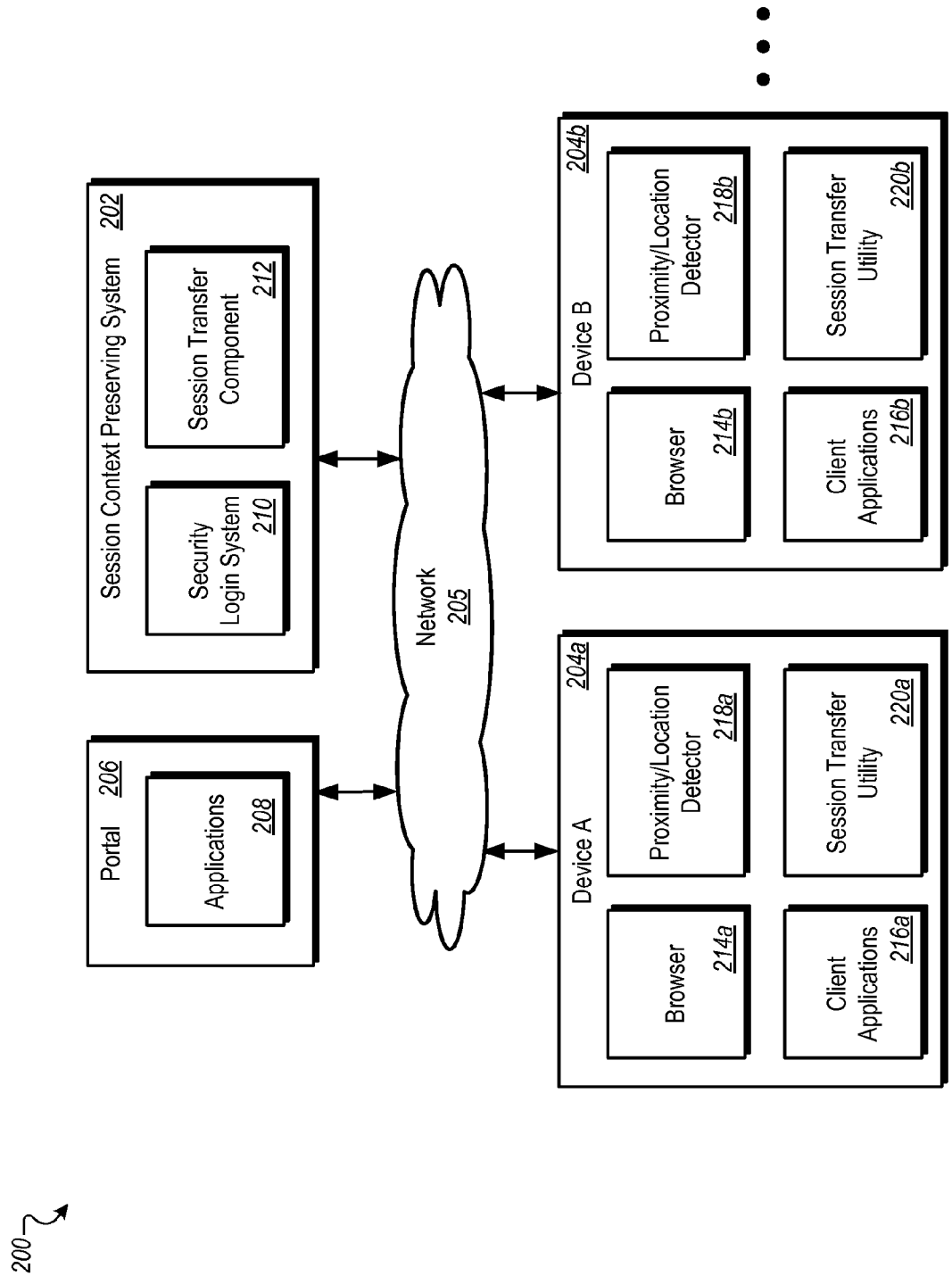
FIG. 2 shows a block diagram and an example architecture of a system for preserving a context of a transferred portal session.

FIG. 2 shows a block diagram and an example architecture of a system 200 for preserving a context of a transferred portal session. For example, elements of the system 200 can be used by the system 100 (FIG. 1) described above with reference to FIG. 1.

The system 200 includes a portal 206 and session context preserving system 202 that can create a second portal session on a device 204b from a first portal session on a device 204a. The second portal session that is created on the device 204b can include a context that is identical to (e.g., transferred or restored from) the context on the first portal session. As an example, referring to FIG. 1, the second context 105 of the second portal session 102b can be restored from the context 104 of the first portal session 102a. A network 205 can connect the devices 204a and 204b to the session context preserving system 202, e.g. using a local area network (LAN), a wide area network (WAN), the Internet, or a combination thereof.

The portal 206 can provide information and support for portal sessions. The portal sessions can be provided for use by users on the device 204a, the device 204b, and/or other devices not shown in FIG. 2. The portal 206 is just one example portal, as the session context preserving system 202 can be used by any suitable portal, and each of which may have its own version of the session context preserving system 202. The portal 206 can include applications 208 that are in a sense under the control of the portal 206 and that are exposed and available to users who have a portal session established with the portal 206.

The session context preserving system 202 can include plural components or engines 210-212, and other engines are possible. A security login system 210 can handle security-related and user credential-related aspects of portal session creation and transfer. The aspects can include, for example, automatically authorizing a user of the device 204b for use of a new portal session that is transferred from the device 204a on which the same user already has a portal session running.

A session transfer component 212 can receive and process session transfer commands, such as when a session transfer command is created and sent by the device 204a to initiate the transfer of a portal session from the device 204a to the device 204b. In some implementations, the session transfer command can comprise or include an NFC message that can be sent, for example, when the device 204a is in close proximity to the device 204b (e.g., when two devices are close enough to be handled by the same individual). The session transfer component 212 can also process session initiation commands, such as the session initiation command that can be received from the device 204b when the user of the device has selected a control to initiate the portal session transferred from the device 204a. For example, a user of the device 204b may initiate the session, discard the session, or save the session for a later time.

The device 204a here includes a browser 214a by which a user can interact with resources on the network 205, such as the portal 206. The device 204a also includes one or more client applications 216a, such as any applications that are local to the device 204a, including one or more applications that provide the user's front-end to the portal 206.

A proximity/location detector 218a and a session transfer utility 220a can be used for transferring a portal session. For example, the proximity/location detector 218a can be used to determine the location and distance of a nearby device to (or from) which a portal session is to be transferred. In some implementations, NFC technology can be used, e.g., to discover the existence of a nearby device and determine whether its distance is within a maximum distance required for the transfer of a portal session. The session transfer utility 220a can accomplish the transfer, e.g., using NFC technology and/or communication over the network 205.

The device 204b can include similar components as those included in the device 204a, e.g., a browser 214b, one or more client applications 216b, a proximity/location detector 218b and a session transfer utility 220b. Some devices may include some or all of similar components and additional ones, as long as each device is able to be the sender and/or recipient of a transferred portal session.

Figure 3:
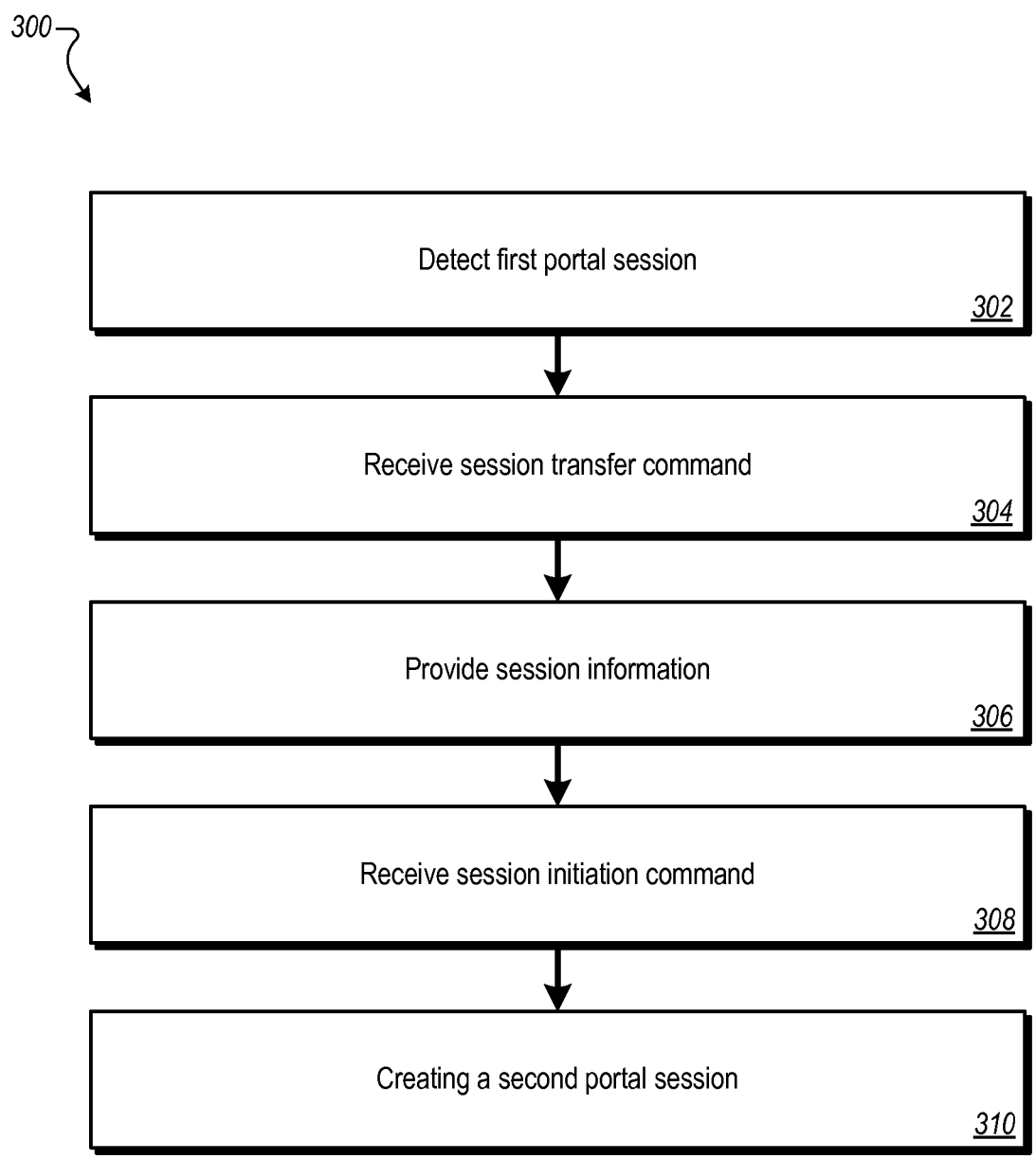
FIG. 3 shows an example of a flow diagram for a process for preserving context for a portal session that is created on another device.

FIG. 3 shows an example of a flow diagram for a process 300 for preserving context for a portal session that is created on another device. In some implementations, the session context preserving system 202 can perform steps of the process 300 using instructions that are executed by one or more processors. Systems 100 (FIG. 1) and 200 (FIG. 2), described above with reference to FIGS. 1 and 2, respectively, provide example structures for performing the steps of the process 300.

At 302, in a system running a portal, it is detected that a first portal session for a first user exists with regard to a first device operated by the first user. As an example, within the system 200 (FIG. 2), the portal 206 can determine that a portal session exists for the first user (e.g., Alan) operating the device 204a (e.g., Alan's smart phone). Alan may access the portal 206, for example, using the browser 214a or one of the client applications 216a.

In some implementations, the first portal session is created after security credentials are submitted when the first user performs a sign-on procedure. For example, Alan may initiate the portal session through the browser 214a or the client applications 216a, such as by supplying a username and password in a login interface associated with the portal 206. The username and password, for example, can comprise the security credentials for logging into and/or accessing the portal 206. Other types of security credentials can also be used in addition to, or instead of, the username and password, including, e.g., voice, biometric, and so on.

At 304, a session transfer command is received that the first user generates using the first device and that indicates at least a second device. For example, while Alan's portal session is active on device 204a, and while Alan is in close proximity to device B (e.g., Alan's or someone else's personal computer or some other device), Alan may select a control and/or position the smart phone near the personal computer, such as within a range associated with NFC. In some implementations, the control selection and/or placement can initiate a session transfer command that is received by the session transfer component 212. In some implementations, the session transfer command can include a near field communication between the first device and the second device The session transfer command can include information from the device 204a, including content information associated with a context that exists on the device 204a at the time that the session transfer command occurs. For example, at the time that Alan initiates the session transfer command, Alan's portal session may have the context 104, e.g., including the first context 104a, the second context 104b, the third context 104c, the fourth context 104d, the fifth context 104e, and/or any other conditions and/or attributes that a user would want to continue on another portal session. The content information can be included with the session transfer command or provided in some other suitable way in order to present the same context on device 204b when the portal session is created there. In another example, referring to FIG. 1, when the context-preserving session transfer 108 occurs, the context 104 of the portal session on the first device 106a is copied to the second device 106b, so that the second context 105 is the same (or as close as possible) to the first context 104.

At 306, in response to the session transfer command, session information is provided to the second device that reflects the first portal session. For example, the session transfer component 212 can use information in the session transfer command, including the context information, to provide session information to device 204b. In some implementations, the session transfer utility 220b can receive the session transfer command, e.g., which can take steps to make it known on the second device that a portal session transfer is being initiated.

At 308, a session initiation command is received that a second user generates using the second device. The session initiation command is generated by the second device based on at least part of the session information. For example, upon receiving the session initiation command, the user of the device 204 can provide inputs through the session transfer utility 220b to initiate a new portal session on the device 204b. The second user in this example, e.g., the user of the device 204, may be Alan or a different user, e.g., Bob. For example, the process 300 can be used to transfer a portal session to a different device of the same user (e.g., when the second user is the first user) or a different user. In some implementations, the session context preserving system 202 can receive the session initiation command from the second device after user selection of a session initiation control and/or the production of security credentials (e.g., username and password) provided at the second device.

In some implementations, the session transfer command can include session credentials associated with the first user and the portal and context information reflecting the first portal session. For example, the session transfer command that the session transfer utility 220*b* receives from the device 204A can include user login information that is associated with the portal.

In some implementations, the process 300 further comprises determining that the first device and the second device are physically separated by at most a certain distance, and providing the session information is conditioned on the determination. For example, the session transfer utility 220*a* on the device 204*a* may not provide the session information unless proximity/location information provided by the proximity/location detector 218*b* indicates that the second device (e.g., the device 204*b*) is within range (e.g., some number of inches, feet or other measure) of the device 204*a*. In some implementations, components of two devices involved in transferring a portal session can communicate with each other, e.g., using NFC communications and to help assure that the portal session transfer can occur successfully. For example, portal sessions may not be allowed to be transferred unless both the proximity/location detector 218*a* and 218*b* indicate that the two devices are proximate enough to support the transfer.

At 310, in response to the session initiation command, a second portal session that corresponds to the first portal session is created in the system. For example, using information provided by the session transfer component 212, the session transfer utility 220*b* can create the second portal session on the device 204*b*.

When the second portal session, for example, portal sessions can be transferred in different ways. In some implementations, sessions can be transferred using a USB interface, email, or some other transferring mechanism. In some implementations, a key can be passed that serves as a URL parameter. The portal can receive the key and use the key to restore the transferred portal session to a relevant context. In some implementations, safeguards can be built into the transfer to provide security, such as including an expiration time for the key (e.g., the key is valid for a minute) and/or notifying the user that a key has been sent.

In some implementations, keys and/or other information for transferring a portal session can be encrypted. The information (e.g., in a key, file or other structure) can be provided directly, or a link can be provided by which the second portal session can obtain the information at a pre-defined location.

In some implementations, the second portal session is created after security credentials are submitted when the second user performs a sign-on procedure. For example, Bob (or Alan) may initiate the second portal session through the browser 214*b* or one of the client applications 216*b* by supplying a user name and password in the login interface associated with the portal 206. If the second user is Alan, then the user name and password can be the same as those used for the first portal session. Otherwise, if the second user is Bob, then the user name and password can be Bob's user name and password for use in logging into the portal 206. The security login system 210 can perform user authorizations that are involved with logging into the portal, as well as any user authorizations and/or other security operations needed for transferring a portal session from one device to another.

The second portal session can be identical or similar to the first portal session. Providing an identical session, at least to the greatest extent possible, can be accomplished by preserving substantially the entire content from one portal session to another. Put another way, creating the second portal session can include restoring a context of the first portal session. For example, the second context 105 that is initially provided with the second portal session can be based on information associated with the first context 104 associated with the first portal session. In this way, the user can continue, on the second portal session, at relatively the same point at which the user left off on the first portal session.

In some implementations, the first portal session is created after security credentials are submitted when the first user performs a sign-on procedure, and the second portal session is created without the second user performing the sign-on procedure. For example, the security login system 210 can perform all necessary user authorization without requiring the user to sign in on the second device.

While some examples involve a portal session being created on a non-mobile device from a mobile device, other examples include non-mobile to mobile portal session creation, mobile to mobile portal session creation, and other suitable portal session creations. For example, the process 300 can be used to create the second portal session on the user's smart phone based on an existing portal session active on the user's person computer, e.g., if the user wishes to continue the portal session while mobile on the way to work.

Figure 4:
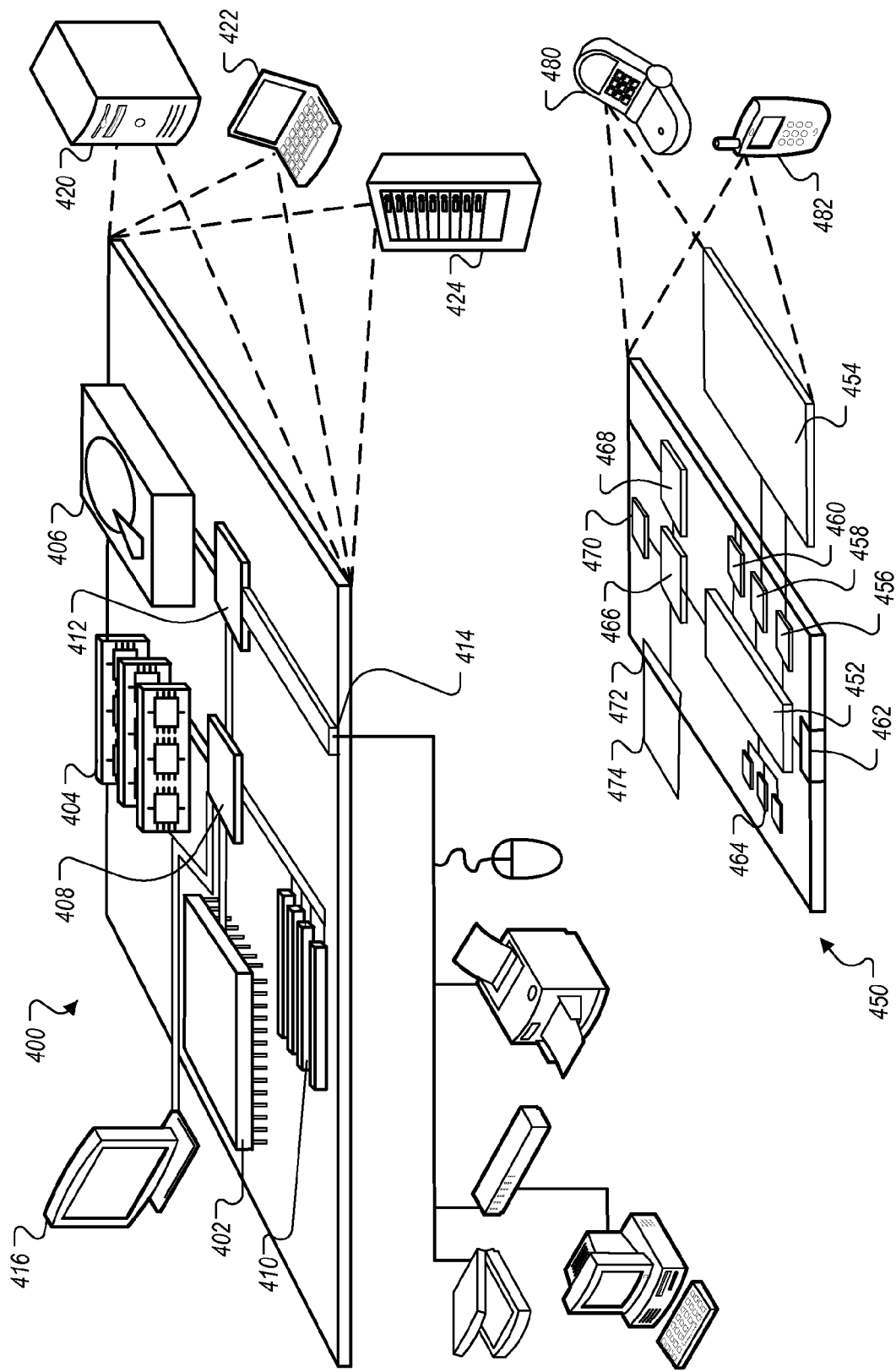
FIG. 4 is a block diagram of a computing system that can be used in connection with computer-implemented methods described in this document.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processers embedded therein or attached thereto. Computing device 450 is intended to represent various forms of mobile devices, such as personal digital assistants, cellular telephones, smartphones, and other computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a micro-drive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a subscriber identification module (SIM) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method comprising:
  detecting, in a system running a portal, that a first portal session for a first user exists with regard to a first device operated by the first user;
  receiving a session transfer command that the first user generates using the first device and that indicates at least a second device, wherein the session transfer command includes:
    session credentials associated with the first user and the portal; and
    context information reflecting the first portal session, the context information including, for a user interface used in the first portal session: one or more currently-selected options, a current address or universal resource locator, current user login information, current portal content, and user inputs;
  in response to the session transfer command, providing session information to the second device that reflects the first portal session;
  receiving a session initiation command that a second user generates using the second device, the session initiation command generated by the second device based on at least part of the session information; and
  in response to the session initiation command, creating a second portal session in the system, the second portal session corresponding to the first portal session, wherein creating the second portal session includes restoring a context of the first portal session in the second portal session using the context information.

2. The method of claim 1 wherein the second portal session is identical to the first portal session.

3. The method of claim 1 further comprising:
determining that the first device and the second device are physically separated by at most a certain distance, wherein providing the session information is conditioned on the determination.

4. The method of claim 1 wherein the first portal session is created after security credentials are submitted when the first user performs a sign-on procedure, and wherein the second portal session is created without the second user performing the sign-on procedure.

5. The method of claim 1 wherein the session transfer command includes a near field communication between the first device and the second device.

6. The method of claim 1, the context information further including a current scroll amount inside the user interface and conditions and attributes to be restored on a second portal session created from the first one.

7. The method of claim 1, the context information further including a current content location in an application used by the user in the first session and a navigational/hierarchical aspect associated with the application.

8. The method of claim 1, wherein creating the second portal session includes using user customization options/settings defining:
a subset of the current context that is to be preserved in a context-preserving session transfer, the subset determined from user selections, including designation of fields holding personal, sensitive or private information that are not to be preserved.

9. The method of claim 1, wherein creating the second portal session includes using rules associated with the portal, the rules limiting the data to be propagated from one portal session to another, including rules to automatically block the restoration of names, addresses, telephone numbers and/or other personal information from being copied to another portal session.

10. The method of claim 1, wherein restoring the context includes maintaining a record of the user's history on the first device, the history identifying the user's recently-visited web pages and recently-used functions.

11. A computer program product embodied in a non-transitory computer-readable storage medium and comprising instructions that when executed by a processor perform a method for transferring portal sessions, the method comprising:
detecting, in a system running a portal, that a first portal session for a first user exists with regard to a first device operated by the first user;
receiving a session transfer command that the first user generates using the first device and that indicates at least a second device, wherein the session transfer command includes:
session credentials associated with the first user and the portal; and
context information reflecting the first portal session, the context information including, for a user interface used in the first portal session: one or more currently-selected options, a current address or universal resource locator, current user login information, current portal content, and user inputs;
in response to the session transfer command, providing session information to the second device that reflects the first portal session;
receiving a session initiation command that a second user generates using the second device, the session initiation command generated by the second device based on at least part of the session information; and
in response to the session initiation command, creating a second portal session in the system, the second portal session corresponding to the first portal session, wherein creating the second portal session includes restoring a context of the first portal session in the second portal session using the context information.

12. The computer program product of claim 11, the method further comprising:
determining that the first device and the second device are physically separated by at most a certain distance, wherein providing the session information is conditioned on the determination.

13. The computer program product of claim 11 wherein the first portal session is created after security credentials are submitted when the first user performs a sign-on procedure, and wherein the second portal session is created without the second user performing the sign-on procedure.

14. The computer program product of claim 11 wherein the session transfer command includes a near field communication between the first device and the second device.

15. The computer program product of claim 11 wherein the session transfer command includes:
session credentials associated with the first user and the portal; and
context information reflecting the first portal session.

16. The computer program product of claim 11 wherein creating the second portal session includes restoring a context of the first portal session.

17. A system comprising:
one or more processors; and
a computer program product embodied in a non-transitory computer-readable storage medium and comprising instructions that when executed cause performance of a method for transferring portal sessions, the method comprising:
detecting, in a system running a portal, that a first portal session for a first user exists with regard to a first device operated by the first user;
receiving a session transfer command that the first user generates using the first device and that indicates at least a second device, wherein the session transfer command includes:
session credentials associated with the first user and the portal; and
context information reflecting the first portal session, the context information including, for a user interface used in the first portal session: one or more currently-selected options, a current address or universal resource locator, current user login information, current portal content, and user inputs;
in response to the session transfer command, providing session information to the second device that reflects the first portal session;
receiving a session initiation command that a second user generates using the second device, the session initiation command generated by the second device based on at least part of the session information; and
in response to the session initiation command, creating a second portal session in the system, the second portal session corresponding to the first portal session, wherein creating the second portal session includes restoring a context of the first portal session in the second portal session using the context information.

18. The system of claim 17, the method further comprising:
determining that the first device and the second device are physically separated by at most a certain distance, wherein providing the session information is conditioned on the determination.

19. The system of claim 17 wherein the first portal session is created after security credentials are submitted when the first user performs a sign-on procedure, and wherein the second portal session is created without the second user performing the sign-on procedure.

20. The system of claim 17 wherein the session transfer command includes a near field communication between the first device and the second device.

* * * * *